United States Patent [19]

Woythal et al.

[11] 4,421,443

[45] Dec. 20, 1983

[54] HIGH SPEED MACHINE TOOL SPINDLE ASSEMBLY

[75] Inventors: Robert T. Woythal, West Allis; Philip J. Finet, Milwaukee, both of Wis.

[73] Assignee: Kearney & Trecker Corporation, West Allis, Wis.

[21] Appl. No.: 316,212

[22] Filed: Oct. 29, 1981

[51] Int. Cl.³ .......................... B23C 9/00; B23Q 1/08
[52] U.S. Cl. ..................................... 409/232; 279/48; 409/234
[58] Field of Search ....................... 409/231, 232, 234; 279/1 A, 1 TS, 56, 48, 42, 36

[56] References Cited

U.S. PATENT DOCUMENTS

| | | | |
|---|---|---|---|
| 3,026,116 | 3/1962 | Marini, Sr. | 279/48 |
| 3,671,050 | 6/1972 | Andersson | 409/232 |
| 3,716,280 | 2/1973 | Leibensperger et al. | 308/207 A |
| 3,882,758 | 5/1975 | Muller | 409/232 |
| 3,894,743 | 7/1975 | Hirumi | 279/48 X |

FOREIGN PATENT DOCUMENTS 528153 10/1976 U.S.S.R. ............................. 409/232

OTHER PUBLICATIONS

Sales Literature, TMI Forest "High Speed Electrospindle with Magnetic Bearing", Nov. 1979.

Primary Examiner—William R. Briggs
Attorney, Agent, or Firm—Quarles & Brady

[57] ABSTRACT

A high speed machine tool spindle assembly for firmly retaining a cutting tool therein, notwithstanding machine tool vibration, includes a spindle having an axially extending bore therethrough. Integrated to each end of the spindle is a tool gripping collet, each collet being urged radially inward against the shank of a cutting tool disposed in the spindle bore by a respective one of a pair of collet nuts which each threadedly engage the spindle adjacent to a separate one of collets at each spindle end. Each of a pair of collet nut drivers is carried by the spindle adjacent to a separate one of the pair of collet nuts and each is slidable along the axis spindle to jointly engage a separate one of the pair of collet nuts and the spindle. Vlier screws are threaded into the spindle adjacent to each collet thereon and extends radially from the spindle to engage a separate one of the collet nut drivers to restrain each collet nut driver from axial movement after each is moved to jointly engage a collet nut and the spindle.

8 Claims, 3 Drawing Figures

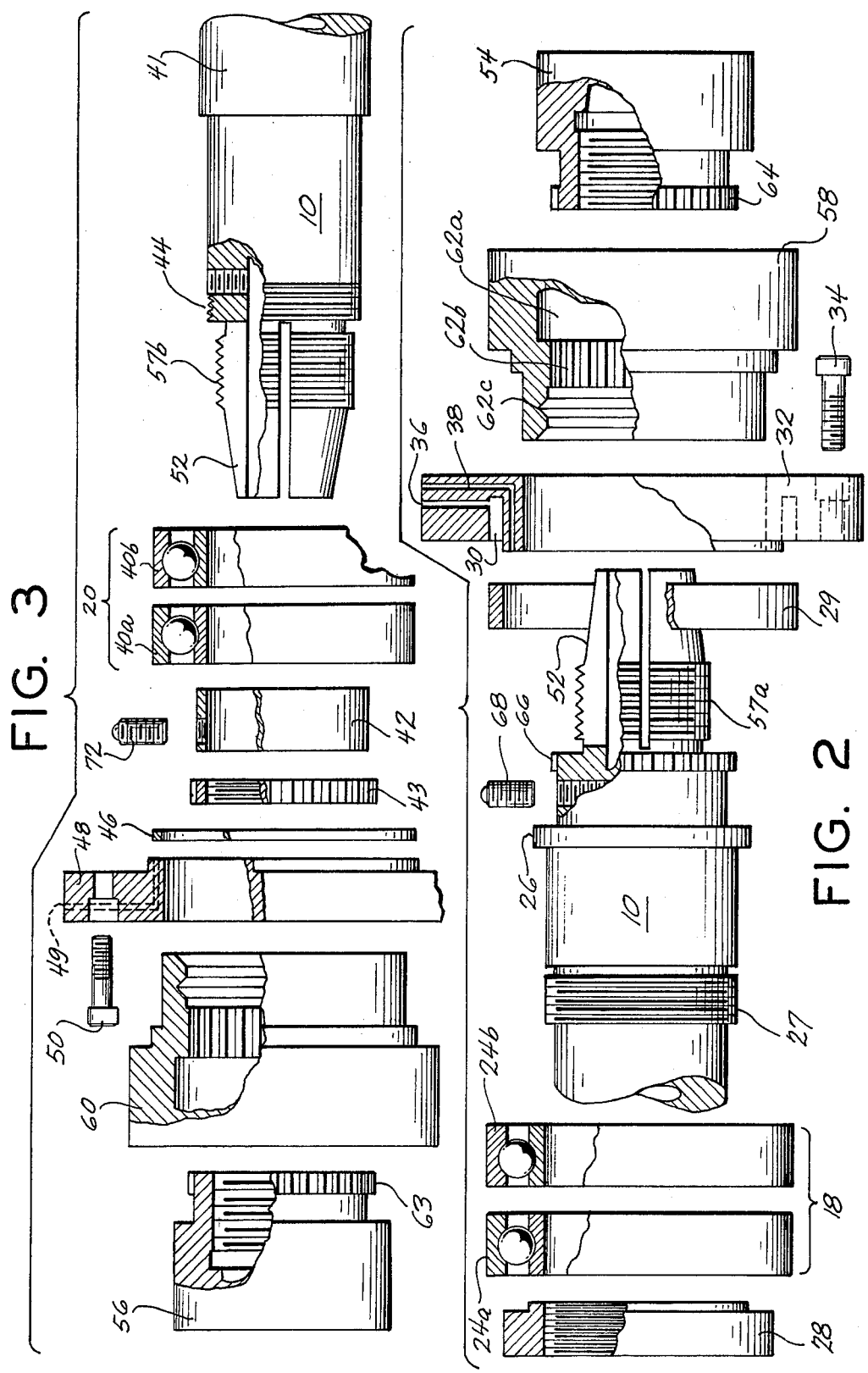

HIGH SPEED MACHINE TOOL SPINDLE ASSEMBLY

BACKGROUND OF THE INVENTION

This invention relates to a machine tool spindle assembly, and more specifically, to a machine tool spindle assembly for firmly retaining a cutting tool therein at high spindle speeds notwithstanding machine tool vibration.

Machining of unfinished parts at ultra high speeds, that is, at speeds of 20,000 to 100,000 RPM, is often more advantageous than machining of such parts at low speeds (e.g. 200-3,000 RPM). Firstly, more material can be removed from an unfinished part during a given interval by machining at ultra high speeds than can be removed during the same interval by machining at low speeds. In addition, ultra high speed machining is more efficient because less horsepower is needed at such high speeds to drive the spindle than is required at low speeds. Further, ultra high machining results in a smoother surface on finished parts.

One of the major problems associated with ultra high speed machining has been retention of the cutting tool within the spindle. Machine tool vibration, usually of little or no consequence during low speed machining, can, at ultra high speeds, cause loosening of the cutting tool within the machine spindle. Loosening of the cutting tool within the spindle may not only result in damage to the cutting tool, but also damage to the unfinished part. More importantly, should the cutting tool become completely disengaged from the spindle during machining operations, serious injury to the machine tool operator can result if the machine cutting tool comes in contact with the operator.

Presently, there exists several different types of high speed machine tool spindles. One type of prior art high speed spindle includes a tool gripping collet integrated to one end of the spindle. The collet is urged radially inward against the shank of a cutting tool disposed within the spindle bore by a single collet nut in threaded engagement with the spindle adjacent to the collet. Another type of high speed machine tool spindle presently in use employs two or more set screws which are threaded into the spindle to bear against the flatted portion of the cutting tool shank. Most recently, a high speed machine tool spindle has been developed which has a bore tapered complementary to the taper of the cutting tool shank. A draw bar is carried within the spindle bore and threadedly engages the end of the cutting tool shank to draw the cutting tool into the spindle bore. Despite the differences among the above-described prior art high speed machine tool spindles, each is believed susceptible to machine tool vibration, which may likely cause disengagement of the cutting tool from the spindle.

It is an object of the present invention to provide a machine tool spindle which firmly retains a cutting tool therein at ultra high spindle speeds.

It is another object of the present invention to provide a machine tool spindle which firmly retains a cutting tool therein notwithstanding machine tool vibrations.

BRIEF SUMMARY OF THE INVENTION

Briefly, in accordance with the preferred embodiment of the invention, a high speed machine tool spindle assembly for firmly retaining a cutting tool therein comprises a spindle having an axially extending bore therethrough. Integrated to each end of the spindle is a collet, each collet being urged radially inwards against the shank of a cutting tool disposed within the spindle bore by a separate one of a pair of collet nuts, each in threaded engagement with the spindle adjacent to a respective one of collets. A pair of collet nut drivers, each comprised of a sleeve or the like, are both carried on the spindle adjacent to a separate one of the spindle ends, respectively. When each collet nut driver is slidably moved along the axis of the spindle from a first to a second position, it engages the spindle and a separate one of the collet nuts, thereby locking the collet nut to the spindle to prevent loosening of the collet nut. Retention means, such as Vlier screws, are threaded into the spindle adjacent to each collet and extend radially from the spindle to bear against an internal annular groove carried by each of the collet nut drivers to prevent axial collet nut driver movement after the collet nut driver is slidably moved to jointly engage the collet nut and the spindle. Restraining each collet nut driver from axial movement in this manner assures that the collet nut and collet nut driver at each end of the spindle rotate cojointly. This prevents loosening of the collet nut and hence, disengagement of the cutting tool from the spindle and thus assures firm retention of the tool within the spindle.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference of the following description taken in conjunction with the accompanying drawings in which:

FIG. 2 is an exploded view of the right hand portion of the spindle of FIG. 1; and FIG. 3 is an exploded view of the left hand portion of the spindle assembly of FIG. 1.

DETAILED DESCRIPTION OF THE PREFERRED EMBODIMENT

Figure 1:
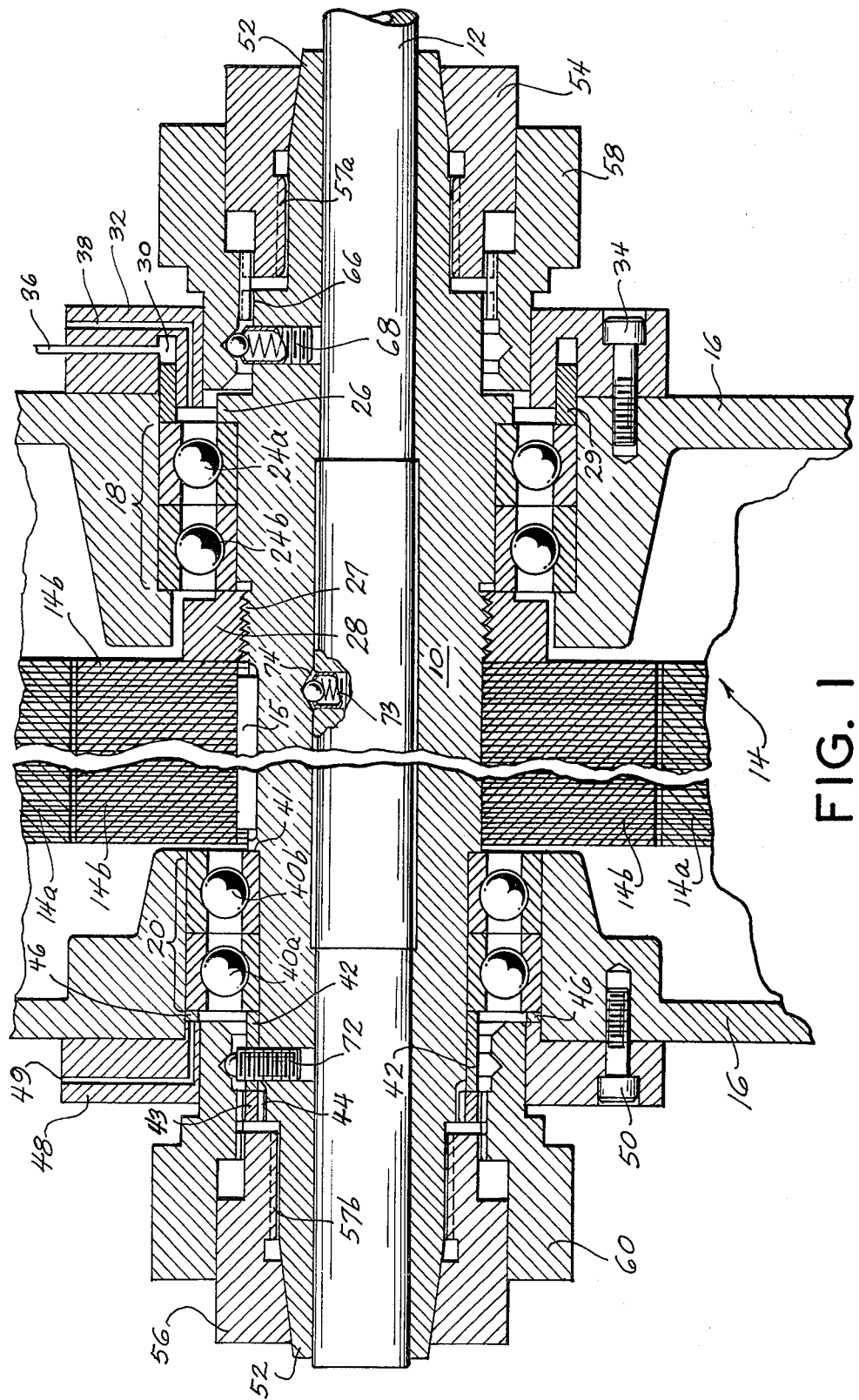
FIG. 1 is a cut away side view of the spindle assembly of the present invention.

FIGS. 1 through 3 illustrate a high speed machine tool spindle assembly according to the present invention comprising a spindle 10 having an axially extending bore therethrough which is dimensioned to receive the shank 12 of a cutting tool. In the presently preferred embodiment, spindle 10 is integral with the shaft of a motor 14 comprised of a stator 14a and rotor 14b. Spindle 10 is keyed to rotor 14b by a key 15 and is journaled to the case 16 of motor 14 by front and rear bearings 18 and 20, respectively, which are disposed in opposite-facing passages located in the front and back, respectively, of motor case 16.

Front bearing 18 comprises a pair of ball bearings 24a and 24b, respectively, which are carried on spindle 10 between a shoulder or flange 26 and threads 27. A nut 28 engages threads 27 on spindle 10 to urge the lower races of ball bearings 24a and 24b against shoulder 26. Adjusting displacement of nut 28 from shoulder 26 serves to vary the force against, or the loading on, the lower ball bearing races. In the presently preferred embodiment, the upper races of ball bearings 24a and 24b are urged against motor case 16 by a horizontally reciprocal annular piston 29 (best illustrated in FIG. 2) which is disposed within a piston chamber 30 in a bearing cap 32 fastened to the front of motor casing 16 by a set of bolts 34 disposed through passages spaced equidistantly about the bearing cap circumference. The amount of force or loading applied by piston 29 against the upper races of ball bearings 24a and 24b is controlled by varying the pressure of the hydraulic fluid admitted to piston chamber 30 through a communicating connecting passage 36. Typically, the pressure of the hydraulic fluid admitted to piston chamber 30 through connecting passage 36 is controlled in accordance with the axial and radial deflection of spindle 10 as measured by magnetic transducers (not shown) in the manner set forth in co-pending application Ser. No. 316059 filed by Richard Johnstone et al on Oct. 29, 1981, and assigned to the assignee of the present invention. Bearing cap 32 also includes a lubrication passage 38 through which an oil-air lubrication mist mixture is supplied from an external source (not shown) to lubricate ball bearings 24a and 24b. The percentage of oil in the oil-air lubrication mist mixture is controlled in accordance with bearing temperature in the manner set forth in the previously identified co-pending Johnstone application.

Referring jointly to FIGS. 1 and 3, rear bearing 18 comprises a pair of ball bearings 40a and 40b which are carried on spindle 10 between a shoulder 41 and the end of a spacer 42. A nut 43, carrying a set of longitudinal splines about its circumference, engages threads 44 on spindle 10 to urge the spacer 42, carried on the spindle, between nut 43 and ball bearing 40a, against the lower race of ball bearing 40a. By adjusting the displacement of nut 43 from shoulder 41, the load on the lower races of ball bearings 40a and 40b can be varied accordingly.

A fitting spacer 46, having an outer diameter substantially equal to the diameter of the upper race of ball bearing 40a, and having a bore therethrough larger than the outer diameter of nut 43 and spacer 44, is carried on spindle 10 coaxial with spacer 44 and is urged by a bearing cap 48, fastened to the back motor case 16 by bolts 50, against the spacer 46 to apply pressure to the upper race of ball bearing 40a to assure proper seating of ball bearings 40a and 40b in the motor case. Bearing cap 48, like its counterpart bearing cap 32, contains a lubrication passage 49 through which, the oil-air lubrication mist mixture is provided to lubricate ball bearings 40a and 40b.

Shank 12 of the cutting tool is firmly retained within the spindle bore at both ends of spindle 10 by each of two collets 52, each collet being integrated to a separate one of the ends of spindle 10, respectively, as illustrated in FIGS. 2 and 3, respectively. Front and rear collet nuts 54 and 56, respectively, each have a bore therethrough which is partially tapered complementary to the taper of collets 52 and each engages a separate one of threads 57a and 57b, respectively, on spindle 10, each adjacent to a separate one of the collets, to urge each of collets 52 radially inward against cutting tool shank 12 to assure firm retention of cutting tool shank 12 within the spindle 10.

To prevent front and rear collet nuts 54 and 56 from loosening during high speed rotation of spindle 10, front and rear collet nut drivers 58 and 60, respectively, are provided to lock collet nuts 54 and 56, respectively, to spindle 10. As may best be seen by reference to FIG. 2, front collet nut driver 58 comprises a sleeve or shell having a bore therethrough which is divided into three interconnected coaxial sections 62a, 62b and 62c, respectively. Bore section 62a is of a diameter greater than each of bore sections 62b and 62c and is sized slightly larger than the outer diameter of front collet nut 54 to permit insertion of the front collet nut into bore section 62a. Bore sections 62b and 62c are each of a diameter slightly larger than the outer diameter of each of splined rim 64 on collet nut 54 and splined rim 66 formed on spindle 10 between shoulder 26 and threads 57a. Bore section 62b carries a set of splines which are complementary to the splines on the exterior of annular rims 64 and 66 on front collet nut 54 and spindle 10, respectively.

As can best be seen by reference to FIG. 1, front collet nut driver 58 is carried on spindle 10 between bearing cap 32 and front collet nut 54 and is slidable along spindle 10 between a first or outward position at which the interior collet nut driver splines engage only the splines on rim 64 on front collet nut 54, and a second or inward position at which the interior splines of the front collet nut driver engage the splines on both rim 64 of front collet nut 54 and rim 66 of spindle 10, thereby locking front collet nut 54 to spindle 10.

When front collet nut driver 58 is moved axially inward from the first to the second position to lock front collet nut 54 to spindle 10, Vlier screws 68, threaded into spindle 10 so as to extend radially from the spindle at equiangular intervals, each engage a V-shaped groove inscribed in bore section 62c of front collet nut driver 58 (illustrated in FIG. 2) to prevent axial shifting of the front collet nut driver. At zero or very low speeds, the force exerted by Vlier screws 68 against front collet nut driver 58 is not large and can easily be overcome to permit outward axial movement of the front collet nut driver so that front collet nut 54 can be threaded onto, or off of spindle 10. However, when spindle 10 rotates at very high speeds, a very large centrifugal force urges Vlier screws 68 firmly against front collet nut driver 58 so as to restrain the front collet nut driver from outward axial movement, thereby preventing loosening of front collet nut 54.

Referring now to FIG. 3, it can be readily observed that the rear collet nut driver 60 is configured identically to front collet nut driver 58 illustrated in FIGS. 1 and 2 and includes a bore therethrough, a portion of which is splined to engage complementary splines on an annular rim 63 formed about the exterior of rear collet nut 56 and complementary splines on nut 44. Returning to FIG. 1, rear collet nut driver 60 is carried on spindle 10 between rear collet nut 56 and rear bearing cap 48 and is slidable along the axis 20 of spindle 10 between a first or outward position at which the splines on rear collet nut driver 60 engage only the splines on rim 63 of rear collet nut 56, and a second or inward position at which the splines inside rear collet nut driver 60 engage both the splines on rim 63 of rear collet nut 56 and on nut 44, thereby locking rear collet nut 56 to spindle 10.

Vlier screws 72 are threaded into spindle 10 adjacent to threads 57b so as to extend through spacer 42 at equiangular intervals and engage a circular groove on the interior bore of rear collet nut driver 60 when the rear collet driver is moved axially inward to its second position. When spindle 10 is at rest or moving very slowly, the force exerted by Vlier screws 72 against the inner bore of rear collet nut driver 60 is relatively weak and, can easily be overcome to permit outward axial movement of rear collet nut driver 60 so that rear collet nut 56 can be threaded onto, or off of spindle 10. At high spindle speeds, centrifugal force firmly urges Vlier screws 70 against the inner bore of rear collet nut driver 60 to prevent axial rear collet nut driver movement, thereby assuring firm engagement of rear collet nut 56 with spindle 10.

Referring once again to FIG. 1, retention of a cutting tool within spindle 10 can be further enhanced by threading Vlier screws 73 into shank 12 of the cutting tool, so that the Vlier screws extend radially from the cutting tool shank to engage a groove 74 inscribed within the bore of spindle 10. At zero or low spindle speeds, the force exerted by Vlier screws 73 against spindle 10 is weak and can easily be overcome to permit tool removal or insertion. At high spindle speeds, centrifugal force firmly urges Vlier screws 73 against spindle 10, thereby enhancing retention of the cutting tool within the spindle.

The foregoing describes a high speed machine tool spindle assembly having tool gripping collets at each end of the spindle which are urged radially inward against the shank of a cutting tool seated in the spindle by a separate one of a pair of collet nuts. Each collet nut is locked to the spindle by a separate one of a pair of collet nut drivers to prevent loosening of the collet nut, and hence loosening of cutting tool in the spindle thereby assuring firm retention of the cutting tool in the spindle.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

The principles of this invention having now been fully explained in connection with the foregoing, we hereby claim as our invention:

1. A high speed machine tool spindle assembly for firmly retaining a cutting tool therein notwithstanding machine tool vibration comprising:
   a spindle having an axially extending bore therethrough and having a first and second set of tool gripping collets extending from a first and second spindle end, respectively;
   first and second collet nuts each in threaded engagement with said spindle adjacent to a separate one of said first and said second collets, respectively, for urging a separate one of said first and said second collets, respectively, radially inward against the shank of a cutting tool disposed within the bore of said spindle;
   first and second collet nut driver means each carried on said spindle adjacent to a separate one of said first and second collet nuts, respectively, each of said first and second collet nut driver means being slidable along the axis of said spindle from a first position to second position to jointly engage a separate one of said first and said second collet nuts, respectively, and said spindle; and
   first and second retention means each threaded into said spindle adjacent to a separate one of said first and second spindle ends, respectively, and extending radially therefrom to engage a separate one of said first and second collet nut driver means when said respective one of said first and second collet nut driver means is slid along the axis of said spindle from said first to said second position.

2. The high speed machine tool spindle assembly according to claim 1 wherein said spindle has an exterior-splined annular rim formed thereon adjacent to said first collet:
   wherein said first collet nut carries an exterior splined annular rim at the end closest to said first collet nut driver means; and
   wherein said first collet nut driver means comprises a sleeve having an axially extending bore therethrough with a section being splined complementary to the splines on said annular rim of said spindle and on said annular rim on said collet nut.

3. The high speed machine tool spindle assembly according to claim 1 further including an exterior splined spacer nut in threaded engagement with said spindle between said second collet and said second retention means;
   wherein said second collet nut carries an exterior splined annular rim at the end closest to said second collet nut driver means; and
   wherein said second collet nut driver means comprises a sleeve having an axially extending bore therethrough with a section which is splined complementary to the splines on said spacer nut and on said collet nut rim.

4. The invention according to claim 1 wherein each of said first and second retention means comprises a Vlier screw.

5. A high speed machine tool spindle assembly for firmly retaining a cutting tool therein comprising:
   a spindle having an axially extending bore therethrough and having at least one tool gripping collet extending from a respective one of the ends of said spindle;
   at least one collet nut threadedly engaging said spindle adjacent to said collet for urging the said collet radially inward against the shank of a cutting tool disposed within the bore of said spindle;
   at least one collet nut driver means carried on said spindle adjacent to said collet nut, said collet nut driver means being slidable along the axis of said spindle from a first to a second position to jointly engage said spindle and said collet nut; and
   retention means threaded into said spindle adjacent to said respective end of said spindle, said retention means extending radially from said spindle to engage said collet nut driver means when said collet nut driver means is slid along the axis of said spindle to said second position.

6. A high speed machine tool spindle assembly for firmly retaining a cutting tool therein comprises:
   a motor having a casing and a hollow bore shaft extending through said casing;
   a hollow bore spindle coaxial with, and integrated to said motor shaft, said spindle having a first and second set of tool gripping collets extending from a first and a second spindle end, respectively;
   first and second bearing means carried on said spindle adjacent to said first and second collets, respectively, for journalling said spindle within to said motor casing;
   means affixed to said motor casing adjacent to said first bearing means for varying the load on said first bearing means;
   first and second collet nuts each in threaded engagement with said spindle adjacent to a separate one of said first and second collets, respectively, for urging said first and second collets radially inward against the shank of a cutting tool disposed within the bore of said spindle;

first and second collet nut driver means each carried on said spindle adjacent to a separate one of said first and second collet nuts, respectively, each of said first and second collet driver means being slidable along the axis of said spindle from a first to a second position to jointly engage said spindle and a separate one of said first and second collet nuts, respectively; and first and second retention means each threaded into said spindle adjacent to a separate one of said first and second bearing means, respectively, each of said first and second retention means extending radially from said spindle to engage a separate one of said first and second collet driver means, respectively, when said separate one of said first and second collet nut driver means, respectively, is slid along the axis of said spindle to said second position.

7. The invention according to claim 6 wherein each of said first and second retention means comprises a Vlier screw.

8. The high speed machine tool spindle assembly according to claim 6 wherein said means for varying the load on said first bearing means comprises:
- a bearing cap fastened to said motor casing to overlie said first bearing means;
- an annular chamber disposed in said bearing cap in communication with said first bearing means;
- a piston reciprocally disposed within said annular channel and contiguous with said first bearing means; and
- a passage in said bearing cap communicating with said annular chamber for admitting hydraulic fluid into said chamber to urge said piston against said first bearing means.

* * * * *